Dec. 11, 1951  R. N. WALLACE  2,578,162
FREE PISTON UNIT ASSEMBLY

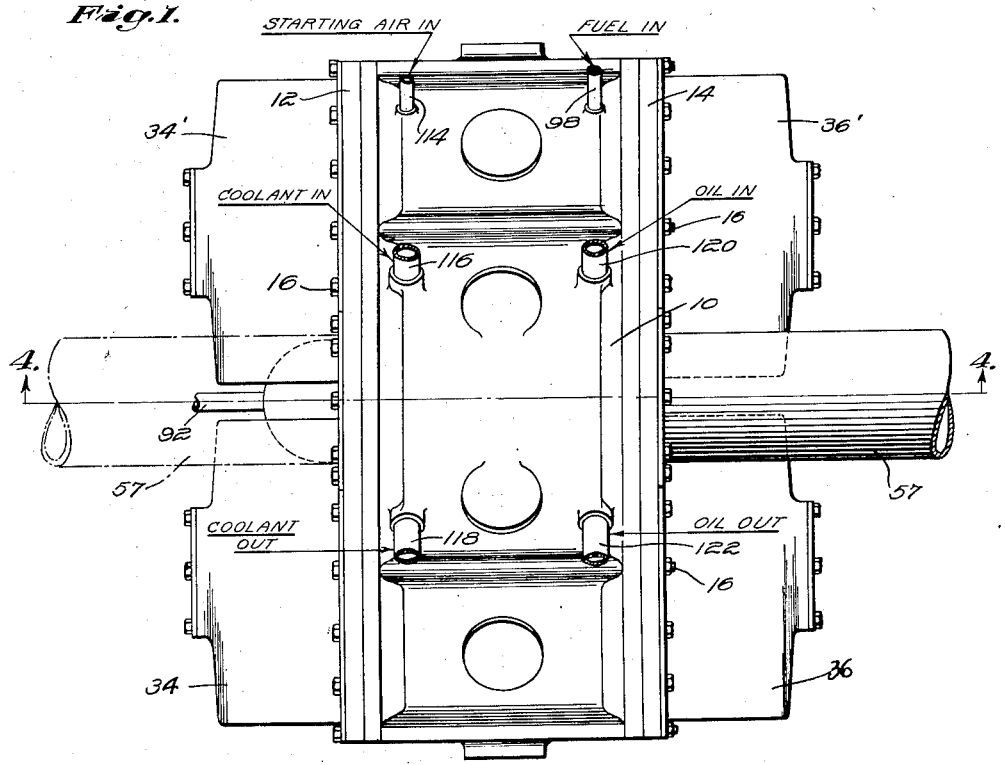
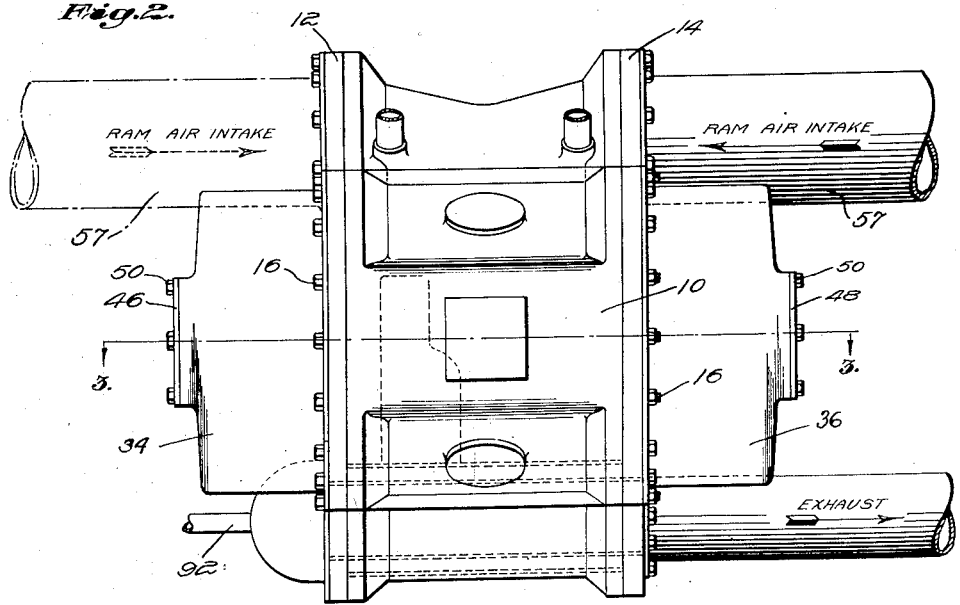

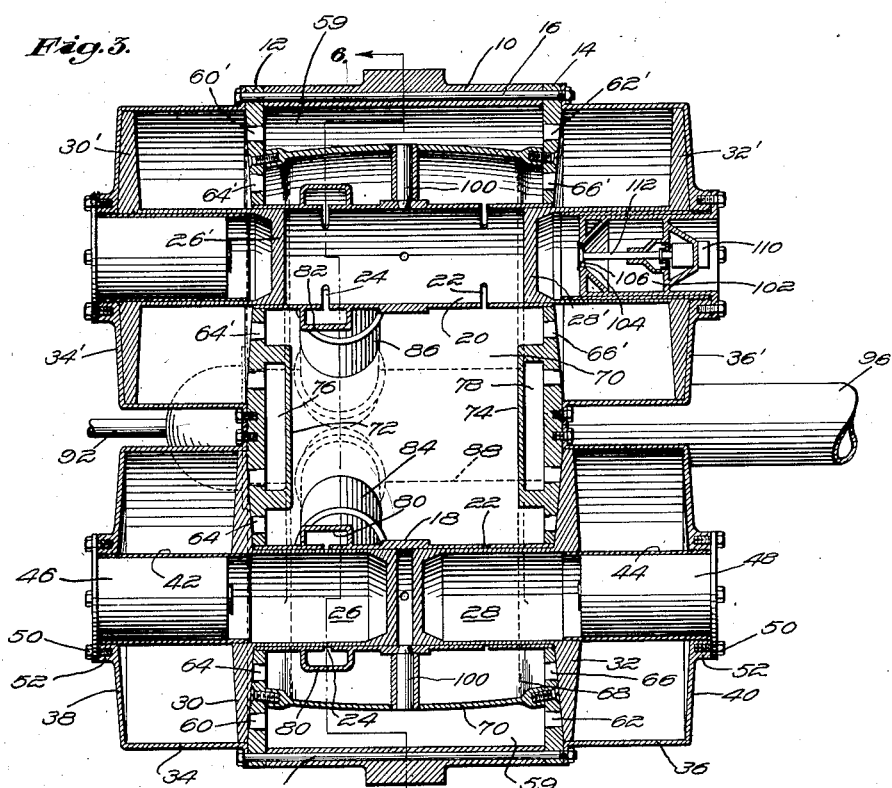

Filed Aug. 25, 1948  4 Sheets-Sheet 3

Inventor
Rudolf N. Wallace
by Charles A. Warren
Attorney

Dec. 11, 1951     R. N. WALLACE     2,578,162
FREE PISTON UNIT ASSEMBLY

Filed Aug. 25, 1948     4 Sheets-Sheet 4

Inventor
Rudolf N. Wallace
by Charles A. Warren
Attorney

Patented Dec. 11, 1951

2,578,162

UNITED STATES PATENT OFFICE 2,578,162

FREE PISTON UNIT ASSEMBLY

Rudolf N. Wallace, Glastonbury, Conn., assignor to United Aircraft Corporation, East Hartford, Conn., a corporation of Delaware Application August 25, 1948, Serial No. 46,141

12 Claims. (Cl. 123—46)

This invention relates to free-piston units and particularly to these units arranged in pairs and constructed to act as hot gas generators.

In the use of free-piston units in a power plant, the large number of connections necessary between the unit and the intake scavenge and exhaust ducts necessitates careful arrangement of the power plant to permit disassembly of any one unit or replacement of the unit if necessary. One feature of the invention is the arrangement of the units in pairs in a single supporting casing thereby halving the necessary power plant connections.

When the units are separate from each other, they are generally allowed to operate independently with no predetermined phase relation between them. A feature of the invention is the operation of the paired units in a predetermined phase relation with each other thereby assuring a more even supply of hot gas to the power plant.

In supplying hot gas for a turbine or other hot gas engine, the hot gas generated by the units may have additional energy added prior to use in the hot gas engine. A feature of the invention is a free-piston unit assembly which incorporates an auxiliary combustion chamber in which additional fuel is burned before the gas is delivered to the hot gas engine.

In aircraft power plants, the weight of the entire power plant is an essential consideration since the lower the weight of the power plant, the greater the pay-load. A feature of the invention is a low-weight, free-piston unit assembly resulting from building up a pair of units in a single unitary assembly.

A feature of the invention is the elimination of all external ducting between components of the free-piston gas generator. Another feature is the concentric arrangement of the ducts or manifolds in such a manner that the gas pressures and temperatures increase from the outermost manifold to the innermost, thereby minimizing the heat loss and giving pressure support to the manifolds having the highest pressures.

Other objects and advantages will be apparent from the specification and claims, and from the accompanying drawings which illustrate an embodiment of the invention.

Fig. 1 is a plan view of the free-piston compressor.

Fig. 2 is a side elevation of the device of Fig. 1.

Fig. 3 is a sectional view substantially along the line 3—3 of Fig. 2.

Fig. 4 is a sectional view substantially along the line 4—4 of Fig. 1.

Figure 6:
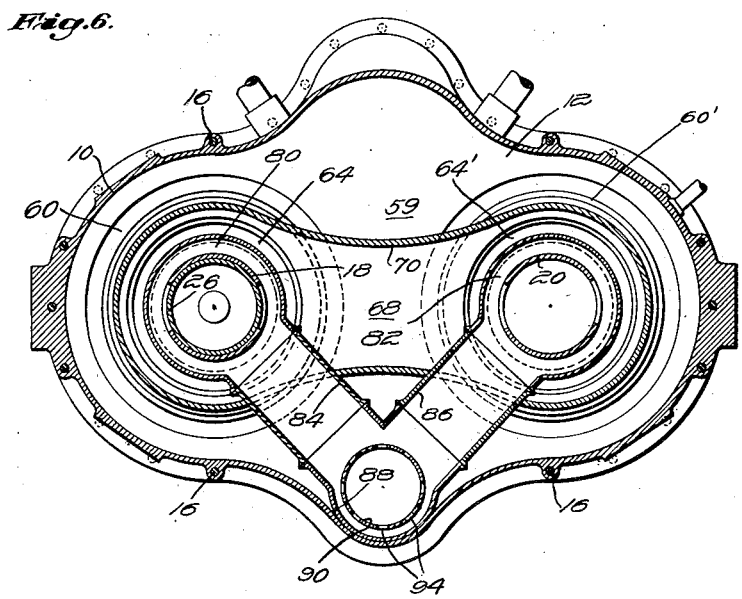
Fig. 6 is a sectional view along the line 6—6 of Fig. 3.

The free-piston unit shown is a twin or double compressor unit and includes a central frame 10, Figs. 3 and 6, substantially in the form of a flattened ring, the ends of which engage with and support spaced plates 12 and 14, being secured to the ring 10, as, for example, by bolts 16. The plates 12 and 14 support, in spaced parallel relation, engine cylinders 18 and 20 for the twin compressor unit. Each engine cylinder has scavenge ports 22 adjacent one end, and exhaust ports 24 adjacent the opposite end.

Referring now to cylinder 18, opposed engine pistons 26 and 28 are mounted therein and carry at their outer ends compressor pistons 30 and 32 reciprocating in compressor cylinders 34 and 36, which, in the arrangement shown, are fastened to the plates 12 and 14 by the above-mentioned bolts 16. The outer ends of the cylinders 34 and 36 are closed by caps 38 and 40 integral with the cylinder and these caps support sleeves 42 and 44 in which starting devices 46 and 48 may be positioned. The inner ends of the starting devices from the heads of air spring pistons over which the hollow engine pistons fit to form air spring. The pressure of air in these springs tends to move the piston assemblies toward each other on the engine compression stroke. The outer ends of the compressor cylinders between the compressor pistons and the outer end caps also function as air springs to assist in moving the pistons inwardly on the compressor stroke. The sleeves 42 and 44 may be threaded into the caps 38 and 40, and the starting devices may be supported as by a row of bolts 50 engaging with a projecting flange 52 on the outer end of the starting device, the caps 38 and 40 having central openings therein, as shown.

Figure 7:
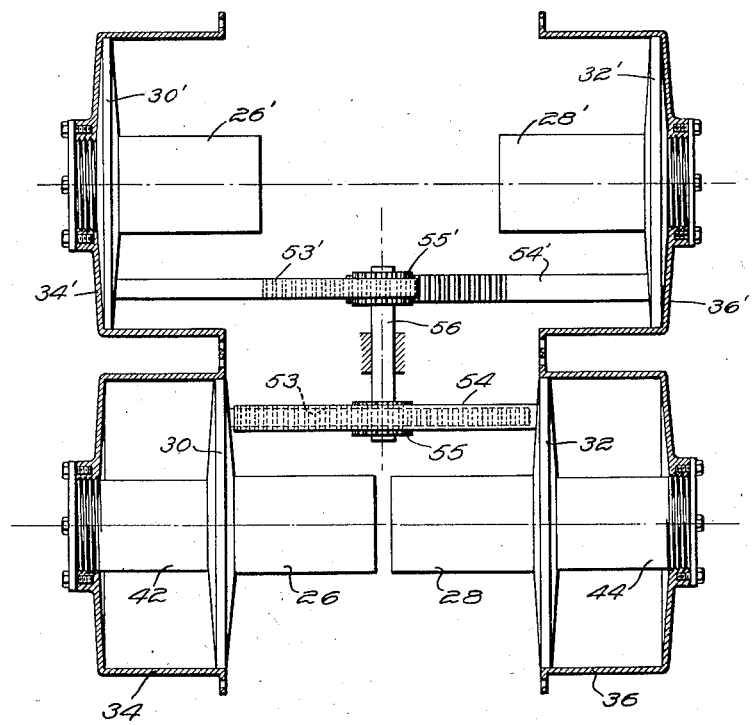
Fig. 7 is a diagrammatic view of the synchronizing linkages.

The piston and cylinder arrangement for the engine cylinder 20 is similar, the piston assemblies being shown in the outermost position in which the scavenge and exhaust ports are uncovered by the engine pistons 26' and 28'. The latter are connected to the compressor pistons 30' and 32' reciprocating within the compressor cylinders 34' and 36'. It will be understood that a suitable synchronizing linkage may be provided to cause the opposed pistons in either engine cylinder to move symmetrically with respect to the engine cylinder, such a linkage being, for example, the well known rack and pinion linkage shown, for example, in the Hooker Patent No. 2,437,026. For example, as shown in Fig. 7, the opposed piston assemblies for cylinder 18 may be interconnected by racks 53 and 54 extending from the pistons 30 and 32, respectively, and meshing with a central pinion 55 having a fixed axis. The piston assemblies for cylinder 20 are similarly interconnected by racks 53' and 54' engaging a central pinion 55'.

A synchronizing linkage may be provided to maintain the piston assemblies of the spaced engine cylinders in predetermined phase relation to each other, as, for example, in the 180° phase relation shown in the drawing. Referring to Fig. 7, the pinions 55 and 55' are both mounted on a shaft 56 for rotation in unison. The racks 53 and 54 are so mounted that the pinion 55 rotates counterclockwise when the piston assemblies move toward each other, rack 54 being on the upper side of the pinion in Fig. 7. The racks 53' and 54' are oppositely arranged so that the pinion 55' is turned counterclockwise when the piston assemblies for cylinder 20 move apart. Thus, the pinions 55 and 55' will both be rotating in the same direction at any point in the operation of the unit. Shaft 56 may have a substantial torsional flexibility to compensate for the differences in the rates of piston movement on the inward and outward strokes. Shaft 56 may also incorporate clutches or other suitable means for varying the degree and nature of coupling between the piston assemblies or for decoupling the piston assemblies for starting or other purposes.

Figure 5:
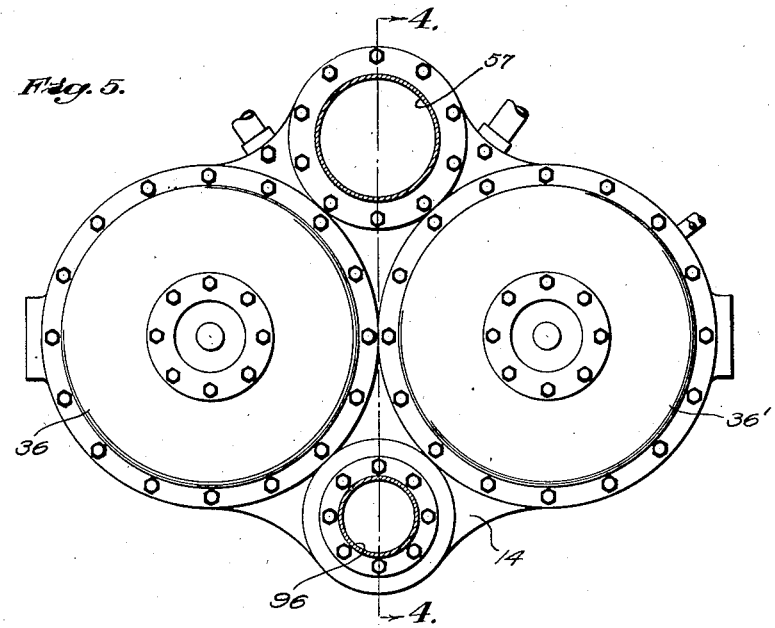
Fig. 5 is an end elevation of the device of Fig. 1.

Air enters the device through one or more inlet ducts 57 communicating with openings 58 in the plates 12 and 14, these openings being located between and out of the plane of the engine cylinders, as shown in Fig. 5. These ducts admit air to a space 59 between the plates 12 and 14, this space being referred to as the inlet manifold. From the manifold 59, air enters the inner ends of the compressor cylinders through rings of valves 60 and 60' in the plate 12 and 62 and 62' in plate 14, respectively, on the outward strokes of the piston assemblies. It will be noted, as shown in Fig. 6, that the rings of valves 60 and 60' extend completely around the associated engine cylinder to provide as great a flow area into the compressor cylinders as possible.

One of the inlet ducts 57 is shown dotted to indicate that only one of the ducts need be used in each installation. For making the unit more universally usable, both inlet openings 58 would normally be provided with the inlet duct 57 connected to the more accessible opening. The other inlet opening 58 could then be closed by a cover plate, not shown.

Also associated with the compressor cylinders 34 and 36 are discharge valves 64 and 64' in the plate 12 and 66 and 66' in the plate 14, respectively. These discharge valves are in the form of rings surrounding the engine cylinder and communicating with a scavenge manifold 68 defined between the plates 12 and 14 by a partition 70 which is located within and spaced from the outer ring 10 of the device, the latter forming the outer boundary of the intake manifold 59. The partition 70 is supported by the plates 12 and 14 and forms a reinforcing interconnection therebetween. Between the parallel engine cylinders the partition is shortened and is provided with end plates 72 and 74, Figs. 3 and 4, which define, adjacent to the plates 12 and 14, extensions 76 and 78 of the intake manifold 59, thereby providing communication from the intake manifold to the entire ring of intake valves, as best shown in Fig. 3.

From the scavenge manifold 59, air enters the scavenge port 22 of the engine cylinders when the ports are uncovered by the engine pistons to scavenge the engine cylinders and to cause discharge of the exhaust gas from the engine cylinders through the exhaust ports 24 and into exhaust rings 80 and 82 surrounding the exhaust ports 24 in the engine cylinders and communicating by ducts 84 and 86, Fig. 6, with an exhaust sleeve 88 parallel to and out of the plane of the engine cylinders. The exhaust rings 80 and 82, the ducts 84 and 86, and the sleeve 88 constitute an exhaust manifold supported by the frame. The exhaust sleeve extends between plates 12 and 14 and may surround a burner duct 90 forming a combustion chamber into one end of which fuel is injected as by a fuel nozzle 92. Exhaust gas from the sleeve 88 enters the burner duct through perforations 94 to provide for combustion for the fuel, and the resulting hot gas is delivered through a duct 96 connected to the outlet end of duct 90, to a turbine or to other gas utilizing device. It is well known that, in engine operating on a two-stroke compression ignition cycle, the fuel is burned in an excess of oxygen so that when the exhaust gas enters the burner duct 90 there is adequate oxygen for combustion of the additional fuel delivered to the burner duct.

With the arrangement of the inlet manifold 59 surrounding the scavenge manifold 68 which in turn surrounds the exhaust collector rings 80 and 82, the manifolds act as insulators to reduce the heat loss from the exhaust gas. As will be apparent, the exhaust gas is substantially hotter than the scavenge air which is in turn hotter than the inlet air, so that heat radiating from the exhaust rings is absorbed by the scavenge and inlet air. Similarly, the scavenge manifold is highly loaded by the gas pressure therein. By surrounding it by the inlet manifold, which is generally pressurized by a ram, in aircraft, the dividing partition 70 is loaded only by the pressure differential between the two manifolds.

Fuel for combustion in the engine cylinders may be delivered through a fuel inlet pipe 98, Fig. 1, which communicates internally of the ring 10 with injection devices 100, Fig. 3, which may be pressure actuated as by the mechanism described and claimed in the copending Hooker application, Serial No. 753,642, filed June 10, 1947, now Patent No. 2,481,927. As an alternative, the injection device may be actuated from the synchronizing linkage, above referred to, as in the Meitzler Patent No. 2,405,043.

The starting device may be, in general, similar to the starting device described in the Meitzler Patent No. 2,439,482. For the purpose of this specification, it may be noted that the starting device includes a chamber 102 which communicates with the air spring by a port 104 closed by a valve 106. The latter is normally held closed by a spring 110 on a plunger, not shown, connected to the valve stem 112. When the unit is to be started, the chamber 102 is charged with starting air until a predetermined pressure is reached at which time the valve 106 is caused to open, the air under pressure in chamber 102 enters the air spring and forces the opposed pistons toward each other on the compression stroke. Since the starting device is not a feature of the present invention, it need not be further described. It may be noted, however, that the starting air supply for all four starting units may enter through a single inlet duct 114, Fig. 1, being connected internally of the unit with the several starting devices. It may be found advantageous to utilize the full automatic starting system described in the Cooper Patent No. 2,424,453.

It may be further noted that with an arrangement of this type, not only may the fuel be delivered to both operating units of the compressor through a single inlet pipe but also the coolant for both engine cylinders, where such coolant is found to be necessary, may be admitted through a single inlet pipe 116 with internal connections to both cylinders. The coolant may discharge through a single discharge pipe 118. The lubricant for both units may also be supplied by a single oil supply pipe 120 with internal connections to the points where lubrication is needed with a single lubrication drain pipe 122.

With the arrangement above described, the free-piston compressor, which, in effect, functions as a generator of hot gas under pressure, is made up of two operating units mechanically connected together to form a single structural unit with the piston assemblies interconnected to maintain the piston assemblies of the interconnected units in predetermined phase relation. The gas generator also incorporates, as an integral part thereof, the combustion chamber of auxiliary burner construction by which heat may be added to the gas from the units in those cases where the temperature of the gas as it leaves the engine cylinders is not adequate for the purpose for which the power gas is to be used. It may be noted that access to either of the units for removal of any one of the piston assemblies is readily possible by the removal of the appropriate compressor cylinder without the necessity for complete disassembly of the entire generator. Thus, any one of the units may be pulled down and reassembled without removal of the entire generator from its position in the group of generators making up the main power plant.

I claim:

1. A free-piston gas generator including a frame, a plurality of engine cylinders supported by said frame in spaced parallel relation to each other, opposed engine pistons in each of said engine cylinders, compressor pistons connected to said engine pistons, compressor cylinders on said frame and fitting over said compressor pistons, and inlet and discharge valves in said frame for the inner end of each compressor cylinder, said frame defining therein an intake manifold communicating with all of the intake valves.

2. A free-piston gas generator including a frame, a plurality of engine cylinders supported by said frame in spaced parallel relation to each other, opposed engine pistons in each of said engine cylinders, compressor pistons connected to said engine pistons, compressor cylinders on said frame and fitting over said compressor pistons, inlet and discharge valves in said frame for the inner end of each compressor cylinder, and a partition within said frame defining a scavenge manifold communicating with said discharge valves.

3. A free-piston gas generator including a frame, a plurality of engine cylinders supported by said frame in spaced parallel relation to each other, opposed engine pistons in each of said engine cylinders, compressor pistons connected to said engine pistons, compressor cylinders on said frame and fitting over said compressor pistons, inlet and discharge valves in said frame for the inner end of each compressor cylinder, and a partition within said frame defining a scavenge manifold communicating with said discharge valves, and with scavenge ports in said engine cylinders.

4. A free-piston gas generator including a frame, a plurality of engine cylinders supported by said frame in spaced parallel relation to each other, opposed engine pistons in each of said engine cylinders, compressor pistons connected to said engine pistons, and compressor cylinders on said frame and fitting over said compressor pistons, said engine cylinder having scavenge and exhaust ports, collector rings surrounding the exhaust ports, a single discharge duct within said frame, and connections from said ring to said single discharge duct, said duct having a combustion chamber therein located within the frame and means mounted on said frame for supplying fuel to said chamber.

5. A free-piston gas generator including a frame, a plurality of engine cylinders supported by said frame in spaced parallel relation to each other, opposed engine pistons in each of said engine cylinders, compressor pistons connected to said engine pistons, and compressor cylinders in said frame and fitting over said compressor pistons, said frame defining an intake manifold, a partition within the frame defining a scavenge manifold, and valved connections between the compressor cylinders and said intake and scavenge manifolds respectively.

6. A free-piston gas generator including a frame, a plurality of engine cylinders supported by said frame in spaced parallel relation to each other, opposed engine pistons in each of said engine cylinders, compressor pistons connected to said engine pistons, and compressor cylinders in said frame and fitting over said compressor pistons, said frame defining an intake manifold, a partition within the frame defining a scavenge manifold, and intake and discharge valves in said frame connecting between the compressor cylinders and the intake and scavenge manifolds respectively.

7. A free-piston assembly including a frame, a plurality of engine cylinders supported by said frame in spaced parallel relation to each other, opposed engine pistons in each of said engine cylinders, compressor pistons connected to said engine pistons, compressor cylinders separable from and mounted on said frame at opposite ends thereof and receiving said compressor pistons, and air spring pistons mounted on the outer ends of said compressor cylinders, said compressor and engine pistons having associated cylinders to receive the air spring pistons.

8. A free-piston assembly including a frame, a plurality of engine cylinders supported by said frame in spaced parallel relation to each other, opposed engine pistons in each of said engine cylinders, compressor pistons connected to said engine pistons, compressor cylinders separable from and mounted on said frame at opposite ends thereof and receiving said compressor pistons, air spring pistons mounted on the outer ends of said compressor cylinders, said compressor and engine pistons having associated cylinders to receive the air spring pistons, inlet and discharge valves in said frame for admitting air into and out of the compressor cylinders, said frame having an inlet manifold connecting with all of said inlet valves.

9. A free-piston assembly including a frame, a plurality of engine cylinders supported by said frame in spaced parallel relation to each other, opposed engine pistons in each of said engine cylinders, compressor cylinders mounted on said frame and receiving said compressor pistons, air spring pistons mounted on said compressor cylinders and fitting within cylinders provided by said compressor and engine pistons, inlet and discharge valves in said frame for admitting air into and out of the compressor cylinders, said frame having a partition defining, in said frame, inlet and scavenge manifolds connecting with said inlet and discharge valves respectively.

10. A free-piston assembly including a frame, a plurality of engine cylinders supported by said frame in spaced parallel relation to each other, opposed engine pistons in each of said engine cylinders, compressor cylinders mounted on said frame and receiving said compressor pistons, air spring pistons mounted on said compressor cylinders and fitting within cylinders provided by said compressor and engine pistons, inlet and discharge valves in said frame for admitting air into and out of the compressor cylinders, said frame having a partition defining, in said frame, inlet and scavenge manifolds connected with said inlet and discharge valves respectively, said engine cylinder having scavenge and exhaust ports therein, the scavenge manifold extending around said cylinders and communicating with said scavenge ports.

11. A free-piston assembly including a frame, a plurality of engine cylinders supported by said frame in spaced parallel relation to each other, opposed engine pistons in each of said engine cylinders, compressor cylinders mounted on said frame and receiving said compressor pistons, air spring pistons mounted on said compressor cylinders and fitting within cylinders provided by said compressor and engine pistons, inlet and discharge valves in said frame for admitting air into and out of the compressor cylinders, said frame having a partition defining, in said frame, inlet and scavenge manifolds connected with said inlet and discharge valves respectively, said engine cylinder having scavenge and exhaust ports therein, the scavenge manifold extending around said cylinders and communicating with said scavenge ports, and an exhaust manifold surrounding the exhaust ports in said cylinders and communicating with a single duct externally of the frame.

12. A free-piston assembly including a frame, a plurality of engine cylinders supported by said frame in spaced parallel relation to each other, opposed engine pistons in each of said engine cylinders, compressor cylinders mounted on said frame and receiving said compressor pistons, air spring pistons mounted on said compressor cylinders and fitting within cylinders provided by said compressor and engine pistons, inlet and discharge valves in said frame for admitting air into and out of the compressor cylinders, said frame having a partition defining, in said frame, intake and scavenge manifolds connected with said inlet and discharge valves respectively, said engine cylinder having scavenge and exhaust ports therein, the scavenge manifold extending around said cylinders and communicating with said scavenge ports, and an exhaust manifold surrounding the exhaust ports in said cylinders, and receiving exhaust gas from said cylinders, said manifold having a combustion chamber therein supported by said frame, said chamber having fuel introducing means associated therewith.

RUDOLF N. WALLACE.

REFERENCES CITED

The following references are of record in the file of this patent:

UNITED STATES PATENTS

| Number | Name | Date |
|---|---|---|
| 1,353,100 | Wales | Sept. 14, 1920 |
| 1,613,116 | Michell | Jan. 4, 1927 |
| 2,085,547 | Schrom | June 29, 1937 |
| 2,139,425 | Steiner | Dec. 6, 1938 |
| 2,163,767 | Steiner | June 27, 1939 |
| 2,167,946 | Gray | Aug. 1, 1939 |
| 2,441,194 | Hooker | May 11, 1948 |